J. W. LEARY.
EXPANDING PULLEY.
APPLICATION FILED DEC. 31, 1917.
1,287,707.
Patented Dec. 17, 1918.
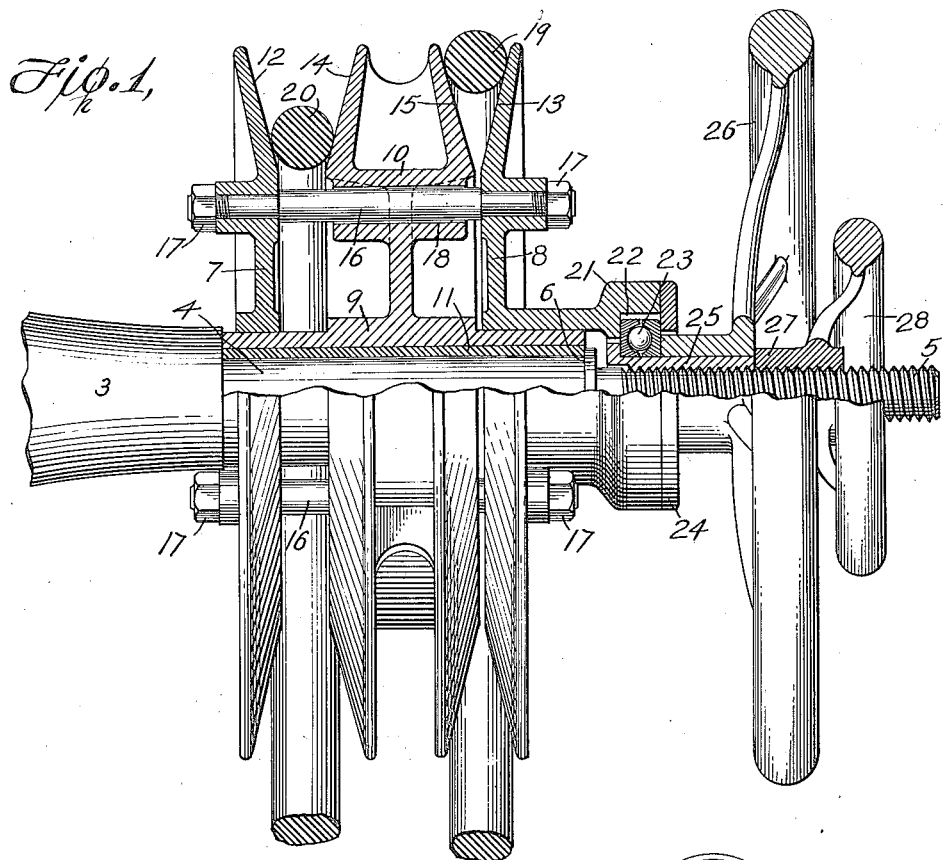
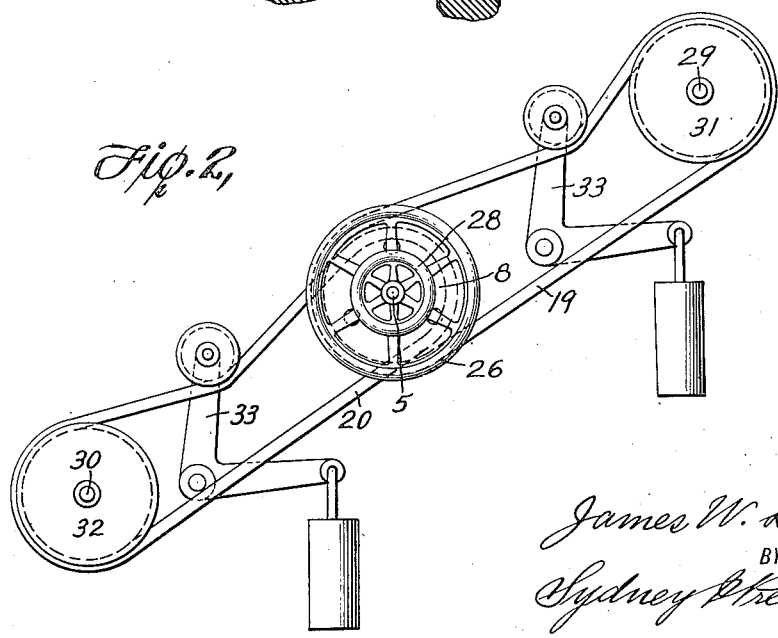
INVENTOR
James W. Leary
BY
Sydney Prescott
ATTORNEY

UNITED STATES PATENT OFFICE.

JAMES W. LEARY, OF RICHMOND HILL, NEW YORK, ASSIGNOR TO AMERICAN MACHINE & FOUNDRY COMPANY, OF NEW YORK, N. Y., A CORPORATION OF NEW JERSEY.

EXPANDING PULLEY.

1,287,707.

Specification of Letters Patent.

Patented Dec. 17, 1918.

Application filed December 31, 1917. Serial No. 209,773.

*To all whom it may concern:*

Be it known that I, JAMES W. LEARY, a citizen of the United States, residing at Richmond Hill, county of Queens, and State of New York, have invented a new and useful Improvement in Expanding Pulleys, of which the following is a specification.

This invention relates to an improvement in expanding pulleys, having for its main object the production of a device of this character with a wider speed range than has been found practicable heretofore. With this and other objects not specifically mentioned in view, the invention consists in certain constructions and combinations which will be hereinafter fully described and then specifically pointed out in the claims hereunto appended.

In the accompanying drawings, which form a part of this specification and in which like characters of reference indicate the same or like parts, Figure 1 is a view in elevation of a device constructed in accordance with the invention, shown partly in section; and Fig. 2 is a diagrammatic layout illustrating the manner in which the device is ordinarily used.

Referring to the drawings, 3 indicates a boss formed on a machine or a part of a machine in connection with which the device is to be used. In this boss is secured a stationary stud 4 having a projecting threaded end 5. This stud serves to support the various parts of the device. The stud is provided with a flange 6 at a point near the middle of its exposed length. There is further provided a pair of side members 7 and 8. These side members are loosely mounted upon the elongated hub 9 of an interposed member 10. The hub 9 is provided with a bush 11 driven therein and rotatably mounted on that part of the stud between the flange 6 and the boss 3. The side member 7 is provided with a conical operating surface 12, and the side member 8 is provided with a conical operating surface 13. Each of these surfaces faces the other. The interposed member 10 is provided with two oppositely disposed operating surfaces marked 14 and 15. The surface 14 co-acts with the side member surface 12 and the surface 15 co-acts with the side member surface 13.

Means are provided for spacing the side members 7 and 8 apart and for connecting them. As shown, this means consists of a series of shouldered bolts 16, each provided with two nuts 17. These bolts are symmetrically arranged about the axis of the stud 4 and engage suitable apertures 18 formed in the interposed member 10. A belt 19 runs in contact with the surfaces 13 and 15, and a belt 20 runs in contact with the surfaces 12 and 14. Either of these belts may be used to impart rotary motion to the side and interposed members, and the other used to transmit motion therefrom, the rotation of all the members in unison being accomplished by means of the bolts 16.

Means are provided for varying the relative distance of the side member operating surfaces from the interposed member operating surfaces. As shown, this is accomplished by moving the side members. With this end in view, the side member 8 is provided with a hub 21 having an axial recess 22. In this recess is mounted a thrust ball bearing 23, and this bearing is held in place by means of a cap 24 secured to the hub 21. The thrust bearing 23 is not carried by the hub of the side member 8, but is carried by a nut 25 and operating hand wheel 26 secured thereto, the nut 25 being threaded on to the projecting threaded end 5 of the stud 4 before referred to. A lock nut is provided and formed by the hub 27 of a smaller hand wheel 28.

In the diagrammatic layout illustrated in Fig. 2, the pulley just described occupies a position between two shafts marked 29 and 30. Secured upon the shaft 29 is a pulley 31 over which the belt 19 runs, and secured upon the shaft 30 is a pulley 32 over which the belt 20 runs. Weight-loaded belt tightening devices, both of well known character and indicated generally by the reference character 33, are employed for keeping both of the belts 19 and 20 taut. By an inspection of Fig. 2, it will be readily understood that if the shaft 29 is the driving shaft, the shaft 30 will rotate at a slower speed. If it is desired to increase the speed of the shaft 30, the lock nut 27 is backed away from the nut 25 and the hand wheel 26 operated to move the side members 7 and 8, to the right in Fig. 1, which will result in permitting the belt 19 to pull in to a smaller diameter over the stud 4 and will force the belt 20 outwardly to a larger diameter. The hand wheel 28 is then operated to jam the lock nut 27 against the nut 25 to prevent accidental displacement of the same.

In certain constructions where great variation of speed is not required and the pulley is to be used not as an intermediate motion transmitting device but as a driving element for a machine, the side member 7 may be omitted and a motion transmitting sleeve substituted for the bush 11 with suitable connections not shown but well known to mechanics generally.

Changes and variations may be made in the structure by means of which the invention is carried into effect. The invention therefore is not to be restricted to the precise details of the structure shown and described. Furthermore, certain parts of the invention are capable of use independent of other parts, and such independent use is contemplated.

What is claimed is:

1. In an expanding pulley, the combination with a pair of side members each having an operating surface facing that of the other, of an interposed member having two oppositely disposed operating surfaces each co-acting with that of one of said side members, means for causing rotation of all said members in unison, a support for said members, and means mounted and longitudinally adjustable on said support for varying the relative distance of the side members from the interposed member.

2. In an expanding pulley, the combination with a pair of side members each having a conical operating surface facing that of the other, of an interposed member having two oppositely disposed conical operating surfaces each co-acting with that of one of said side members, means for causing rotation of all said members in unison, a support for said members, and means mounted and longitudinally adjustable on said support for varying the relative distance of the side members from the interposed member.

3. In an expanding pulley, the combination with a pair of side members each having an operating surface facing that of the other, of an interposed member provided with an elongated hub supporting said side members and having two oppositely disposed operating surfaces each co-acting with that of one of said side members, means for causing rotation of all said members in unison, a support for said members, and means mounted and longitudinally adjustable on said support for varying the relative distance of the side members from the interposed member.

4. In an expanding pulley, the combination with a pair of side members each having an operating surface facing that of the other, of an interposed member provided with an elongated hub supporting said side members and having two oppositely disposed operating surfaces each co-acting with that of one of said side members, means for supporting the interposed member, means for causing rotation of all said members in unison, and means mounted and longitudinally adjustable on said supporting means for varying the relative distance of the side members from the interposed member.

5. In an expanding pulley, the combination with a pair of side members each having an operating surface facing that of the other, of an interposed member provided with an elongated hub supporting said side members and having two oppositely disposed operating surfaces each co-acting with that of one of said side members, a stationary support for said interposed member, means for causing rotation of all said members in unison, and means mounted and longitudinally adjustable on said support for varying the relative distance of the side members from the interposed member.

6. In an expanding pulley, the combination with a pair of side members each having an operating surface facing that of the other, of an interposed member having two oppositely disposed operating surfaces each co-acting with that of one of said side members, means for spacing and connecting said side members and for causing rotation of all said members in unison, a support for said members, and means mounted and longitudinally adjustable on said support for varying the relative distance of the side members from the interposed member.

7. In an expanding pulley, the combination with a pair of side members each having an operating surface facing that of the other, of an interposed member provided with a series of longitudinal and symmetrically arranged apertures and having two oppositely disposed operating surfaces each coacting with that of one of said side members, a series of shouldered bolts spacing and connecting the side members and working in the apertures of the interposed member for causing rotation of all said members in unison, a support for said members, and means mounted and longitudinally adjustable on said support for varying the relative distance of the side members from the interposed member.

8. In an expanding pulley, the combination with a pair of side members each having an operating surface facing that of the other, of an interposed member having two oppositely disposed operating surfaces each co-acting with that of one of said side members, means for causing rotation of said members in unison, a support for said members, and means mounted and longitudinally adjustable on said support for moving said side members to vary the relative distance of the same from the interposed member.

9. In an expanding pulley, the combination with a pair of side members each having an operating surface facing that of the other, of an interposed member having two oppositely disposed operating surfaces each co-acting with that of one of said side members, means spacing and connecting said side members and engaging said interposed member for causing rotation of all said members in unison, a support for said members, and means mounted and longitudinally adjustable on said support for moving said side members to vary the relative distance of the same from the interposed member.

10. In an expanding pulley, the combination with a pair of side members each having an operating surface facing that of the other, of an interposed member having two oppositely disposed operating surfaces each co-acting with that of one of said side members, means spacing and connecting said side members and engaging said interposed member for causing rotation of all said members in unison, a support for said members, and means mounted and longitudinally adjustable on said support and connected with one of said side members and co-acting with said spacing and connecting members to move said side members to vary the relative distance of the same from the interposed member.

11. In an expanding pulley, the combination with a pair of side members each having an operating surface facing that of the other, of an interposed member provided with an elongated hub supporting said side members and having two oppositely disposed operating surfaces each co-acting with that of one of said side members, a stud for supporting the interposed member and having a threaded projecting end, means for spacing and connecting said side members and for causing rotation of all said members in unison, and means connected with one of said side members and co-acting with the threaded end of the stud for varying the relative distance of the side members from the interposed member.

12. In an expanding pulley, the combination with a pair of side members each having an operating surface facing that of the other, of an interposed member provided with an elongated hub supporting said side members and having two oppositely disposed operating surfaces each co-acting with that of one of said side members, a stud for supporting the interposed member and having a threaded projecting end, means for spacing and connecting said side members and for causing rotation of said members in unison, a nut threaded on the stud, a thrust bearing carried by the nut and engaging one of said side members for varying the relative distance of the side members from the interposed member.

13. In an expanding pulley, the combination with a pair of side members each having an operating surface facing that of the other, of an interposed member having two oppositely disposed operating surfaces each co-acting with that of one of said side members, a supporting stud having a threaded projecting end, means for causing rotation of all said members in unison on said stud, and means connected with one of said side members and co-acting with the threaded end of the stud for varying the relative distance of the side members from the interposed member.

In testimony whereof, I have signed my name to this specification.

JAMES W. LEARY.